(12) United States Patent
Matthews

(10) Patent No.: US 12,005,781 B2
(45) Date of Patent: Jun. 11, 2024

(54) IN-MODULE MEDIA ASSEMBLY

(71) Applicant: Nissan North America, Inc., Franklin, TN (US)

(72) Inventor: Christopher Matthews, Farmington Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 767 days.

(21) Appl. No.: 17/056,706

(22) PCT Filed: May 31, 2018

(86) PCT No.: PCT/US2018/035469
§ 371 (c)(1),
(2) Date: Nov. 18, 2020

(87) PCT Pub. No.: WO2019/231459
PCT Pub. Date: Dec. 5, 2019

(65) Prior Publication Data
US 2021/0206271 A1 Jul. 8, 2021

(51) Int. Cl.
*B60K 35/50* (2024.01)
*B60R 11/02* (2006.01)
*B60K 35/22* (2024.01)

(52) U.S. Cl.
CPC .............. *B60K 35/50* (2024.01); *B60R 11/02* (2013.01); *B60K 35/22* (2024.01); *B60K 2360/688* (2024.01); *B60K 2360/691* (2024.01)

(58) Field of Classification Search
CPC .............. B60K 37/04; B60K 2370/152; B60K 2370/688; B60K 2370/691;
(Continued)

(56) References Cited

U.S. PATENT DOCUMENTS 1,352,004 A * 9/1920 Kessel ................. A47G 23/025
222/179.5
5,104,071 A 4/1992 Kowalski
(Continued)

FOREIGN PATENT DOCUMENTS

EP 3045340 A1 * 7/2016 ............. B60K 35/00
JP H05-319141 A 12/1993
(Continued)

OTHER PUBLICATIONS

International Search Report in PCT/US2018/035469 dated Aug. 2, 2018.
Written Opinion, dated Aug. 2, 2018.

*Primary Examiner* — Kimberly T Wood
(74) *Attorney, Agent, or Firm* — Global IP Counselors, LLP

(57) ABSTRACT

An in-module media assembly includes a display screen, a media chassis and a shock absorbing member. The display screen has an interior-facing side and a non-interior facing side. The media chassis is mounted to a lower half of the display screen and extends from the non-interior facing side of the display screen. The shock absorbing member has a screen attachment part and a contact part. The screen attachment part is attached to an upper half of the display screen and extends from the non-interior facing side. The contact part is configured to at least one of contact the media chassis and displace relative to the media chassis upon relative movement of the upper half of the display screen towards the media chassis.

12 Claims, 14 Drawing Sheets

(58) Field of Classification Search
CPC ............ B60K 2370/1523; B60K 35/00; B60K 2370/63; B60K 2370/816; B60R 11/02; B60R 21/055
See application file for complete search history.

(56) References Cited

U.S. PATENT DOCUMENTS

| | | | |
|---|---|---|---|
| 9,927,642 B2* | 3/2018 | Larry | B60K 35/00 |
| 9,978,923 B2 | 5/2018 | Nakabayashi et al. | |
| 11,054,685 B2* | 7/2021 | Faraj | B60K 35/50 |
| 2006/0108820 A1* | 5/2006 | Vican | B60R 11/0235 296/37.1 |
| 2006/0249632 A1* | 11/2006 | McKelvey | B60R 11/02 224/539 |
| 2007/0223137 A1 | 9/2007 | Boggess et al. | |
| 2008/0265607 A1 | 10/2008 | Biggs et al. | |
| 2009/0127897 A1* | 5/2009 | Watanabe | B60R 11/0235 297/217.3 |
| 2009/0154134 A1 | 6/2009 | Hassler | |
| 2009/0268411 A1 | 10/2009 | Baker | |
| 2010/0187272 A1 | 7/2010 | Takeda et al. | |
| 2012/0160974 A1* | 6/2012 | Washiyama | B60R 11/02 248/201 |

FOREIGN PATENT DOCUMENTS

| | | | |
|---|---|---|---|
| JP | 2001-347895 A | | 12/2001 |
| JP | 2003-034162 A | | 2/2003 |
| JP | 2004-122887 A | | 4/2004 |
| JP | 2005132290 A | * | 5/2005 |
| JP | 2007-261571 A | | 10/2007 |
| JP | 2007-290552 A | | 11/2007 |
| JP | 2008-114808 A | | 5/2008 |
| JP | 2013047075 A | | 3/2013 |
| JP | 2013082362 A | * | 5/2013 |
| JP | 2016-037216 A | | 3/2016 |

* cited by examiner

IN-MODULE MEDIA ASSEMBLY

BACKGROUND

Cross-Reference to Related Applications

This application is a U.S. National Stage application of International Application No. PCT/US2018/35469, filed May 31, 2018, the contents of each of which are hereby incorporated herein by reference.

Field of the Invention

The present invention generally relates to an in-module media assembly for a vehicle. More specifically, the present invention relates to an in-module media assembly configured to be installed into a vehicle cockpit module or dashboard.

Background Information

Vehicles typically include media assemblies that provide in-vehicle entertainment for vehicle occupants in the form of video and audio. Most vehicles include a cockpit module having a pre-formed opening that receives a media assembly into a cavity of the vehicle. Cockpit modules and media assemblies have been made for convenient replacement of stock media assembly in the event of a replacement.

SUMMARY

In view of the state of the known technology, one aspect of the present disclosure is to provide and in-module media assembly. An in-module media assembly includes a display screen, a media chassis and a shock absorbing member. The display screen has an interior-facing side and a non-interior facing side. The media chassis is mounted to a lower half of the display screen and extends from the non-interior facing side of the display screen. The shock absorbing member has a screen attachment part and a contact part. The screen attachment part is attached to an upper half of the display screen and extends from the non-interior facing side. The contact part is configured to at least one of contact the media chassis and displace relative to the media chassis upon relative movement of the upper half of the display screen towards the media chassis.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
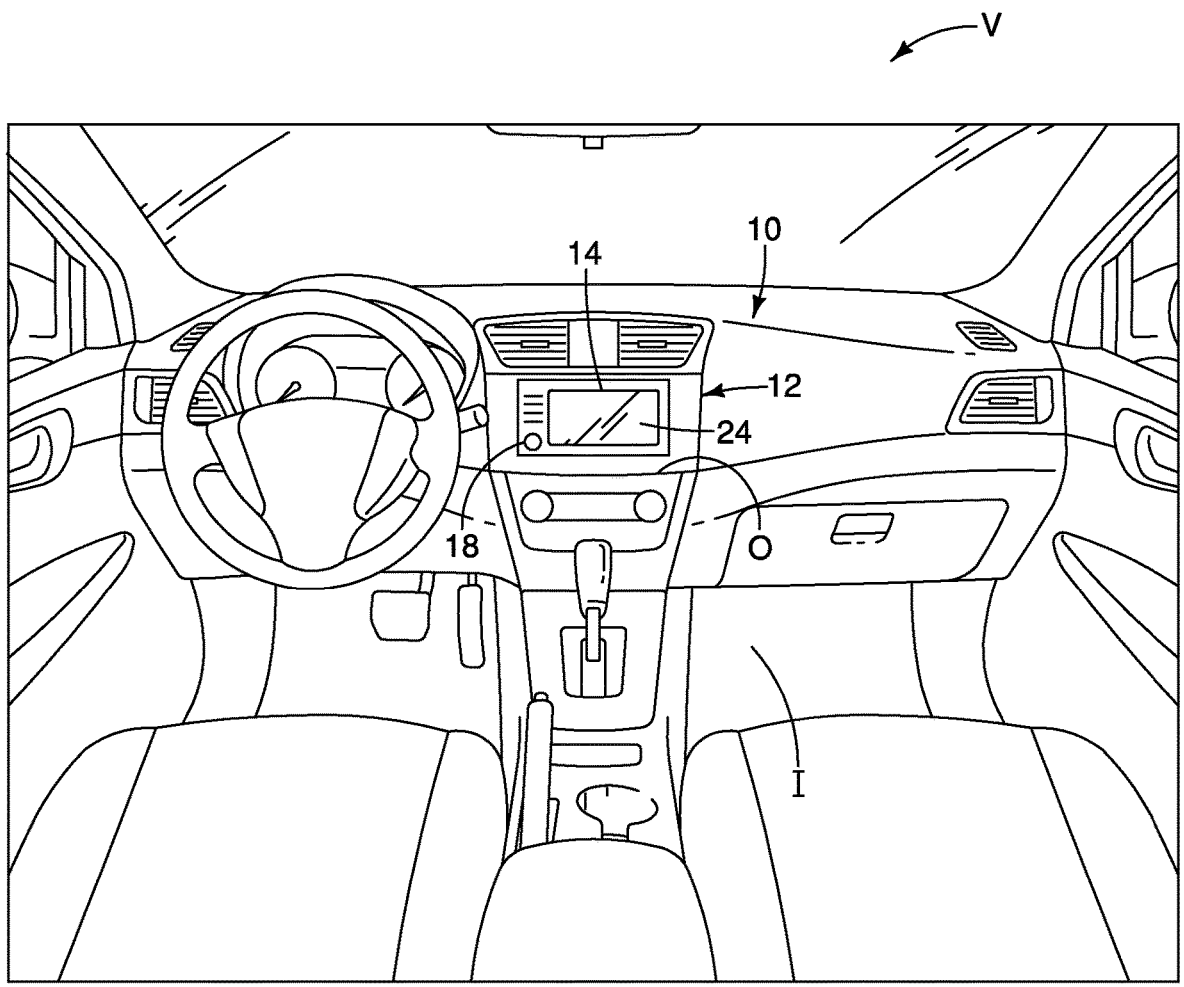
FIG. 1 is an elevational view of a vehicle interior showing a cockpit module having an in-module media assembly in accordance with a first illustrated embodiment.

Referring initially to FIG. 1, an interior I of a vehicle V is illustrated in accordance with a first illustrated embodiment. The vehicle V includes a cockpit module 10 and an in-module media assembly 12 configured to be supported in a cavity (not shown) located behind the cockpit module 10. The cockpit module 10 is a control panel that is located directly ahead of the vehicle driver. The cockpit module 10 is configured to display instrumentation and controls for the vehicle operation (e.g., a speedometer, tachometer, odometer, fuel gauge, turn indicators, gearshift position indicator, heating and ventilation systems, lighting controls, safety systems, entertainment equipment and navigation systems). The in-module media assembly 12 of the illustrated embodiment is configured to be installed into the vehicle V cockpit module 10.

In the illustrated embodiment, the in-module media assembly 12 is considered part of the entertainment equipment for the vehicle V. In other words, the in-module media assembly 12 includes equipment installed to provide in-vehicle entertainment and information for the vehicle occupant(s) (not shown). The in-module media assembly 12 preferably includes audio equipment such as a radio, cassette or CD players. The in-module media assembly 12 can additionally include video players and equipment enabling universal serial bus (USB) and Bluetooth connectivity, in-vehicle Internet and WiFi. The in-module media assembly 12 comprises a display screen 14 and a media chassis 16. The display screen 14 displays information to the vehicle occupant. The media chassis 16 is configured to support and/or protect the media/audio equipment installed in the cockpit module 10. Optionally, the in-module media assembly 12 can further include equipment for the vehicle telematics, telecommunication, in-vehicle security, handsfree calling, navigation and remote diagnostic systems. The in-module media assembly 12 can include a control interface 18 for occupant operation, such as knobs and dials. The in-module media assembly 12 can alternatively be controlled by steering wheel audio controls and handsfree voice control.

The in-module media assembly 12 further comprises a shock absorption member 20 that is fixedly attached to at least one of the display screen 14 and the media chassis 16. Conventionally, when the vehicle V experiences an impact with an external object, an interior object (not shown) of the vehicle V (e.g., the occupant) can make contact with a conventional media assembly. A conventional display screen 14 of the conventional media conventional media assembly is likely to pivot or tilt in a vehicle forward direction and into the interior of the cockpit module 10. As a result, the interior object can move into the cavity behind the cockpit module 10 where various electronic units are housed, such as the media chassis 16 of the conventional media assembly. The shock absorption member 20 of the illustrated embodiment is configured to absorb the impact that is received by the in-module media assembly 12. In particular, the shock absorption member 20 is configured to absorb some of the impact received from the interior object so that the display screen 14 of the in-module media assembly 12 does not pivot or tilt as much as a conventional display screen 14 to prevent the interior object from making contact with the electronic units behind the cockpit module 10. The display screen 14, the media chassis 16 and the shock absorption member 20 will be further discussed below.

Figure 2:
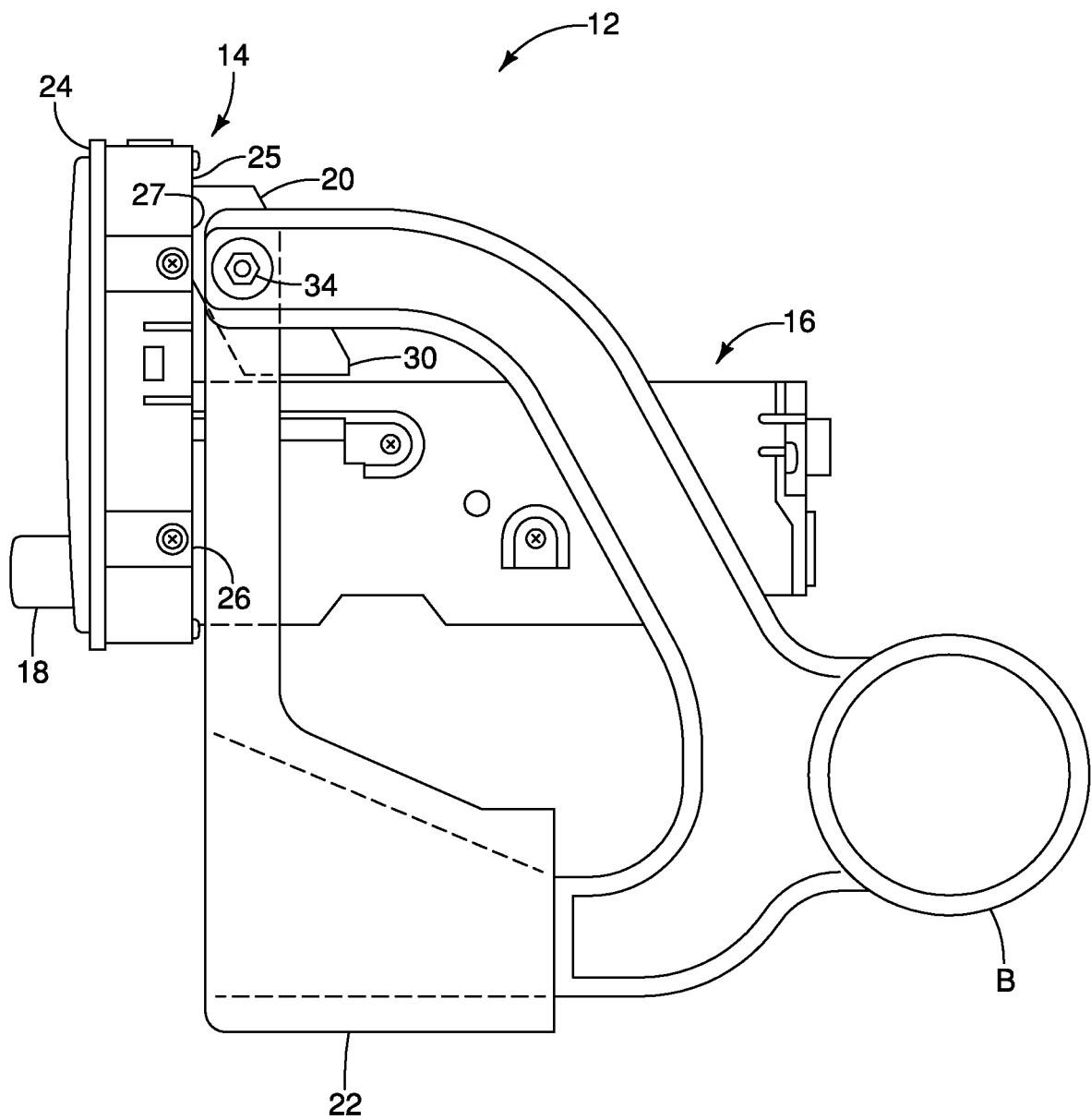
FIG. 2 is a side elevational view of the in-module media assembly fixed to a media chassis support structure.

In the illustrated embodiment, the cockpit module 10 includes a pre-formed opening O sized and dimensioned to receive the in-module media assembly 12 into the cavity. The cockpit module 10 and in-module media assembly 12 of the illustrated embodiment is configured for convenient replacement of a stock media system with an aftermarket media assembly if needed and/or desired. As seen in FIG. 2, the in-module media assembly 12 is supported in the cockpit module 10 by a media chassis support structure 22. Thus, the media chassis support structure 22 supports the in-module media assembly 12 within the vehicle V. The media chassis support structure 22 is adapted to mount the media chassis 16 in the vehicle V. Alternatively, the media chassis support structure 22 can be embedded in the cockpit module 10, the center console or the roof of the vehicle V in any known manner. In illustrated embodiment, the media chassis support structure 22 is embedded inside the pre-formed opening O of the cockpit module 10.

In the illustrated embodiment, the media chassis support structure 22 includes a pair of rigid members supporting the media chassis 16 to the cockpit module 10. In particular, the media chassis support structure 22 includes a first rack mount 22A and a second rack mount 22B that are attached to opposite lateral sides of the in-module media assembly 12. In particular, the first and second rack mounts 22A and 22B are fixedly installed to the shock absorption member 20, as will be further discussed below. In the illustrated embodiment, each of the first and second rack mounts 22A and 22B includes a receiving hole R1 for connection configured to receive a connecting structure (e.g., conventional screws, self-tapping screws or bolts) to attach the in-module media assembly 12 to the media chassis support structure 22. It will be apparent to those skilled in the vehicle field from this disclosure that the first and second rack mounts 22A and 22B can include additional receiving holes R1 as needed and/or desired.

The media chassis support structure 22 is shown schematically in this disclosure. It will be apparent to those skilled in the vehicle field from this disclosure that the media chassis support structure 22 can comprise any structure or set of structures that allow media chassis 16 to be mounted and supported in the vehicle V. Thus, it will be apparent to those skilled in the vehicle field from this disclosure that the media chassis 16 support can include additional support members or alternatively be an integrated one-piece member.

As seen in FIG. 2, the media chassis support structure 22 is fixedly connected to a cross-car beam B of the vehicle V. In the illustrated embodiment, the cross-car beam B is a structural member that is located underneath the cockpit module 10 inside the cavity. The cross-car beam B extends within the cavity such that the vehicle cross-car beam B positions and secures the in-module media assembly 12 in the cavity. The cross-car beam B is secured a vehicle V body structure (not shown) by welds, bolts or other suitable securing members. While the cross-car beam B of the illustrated embodiment is located forward of the cockpit module 10, it will be apparent to those skilled in the vehicle field from this disclosure that the in-module media assembly 12 can be secured to a cross-car beam B that is situated adjacent to the cockpit module 10.

Referring to FIGS. 2 to 8, the display screen 14 will now be discussed. The display screen 14 is sized and dimensioned to correspond to portions of the pre-formed opening O of the cockpit module 10. Thus, it will be apparent to those skilled in the vehicle V from this disclosure that size and dimensions of the display screen 14 is variable as needed and/or desired. The display screen 14 has an interior-facing side 24 and a non-interior facing side 25. The interior-facing side 24 of the display screen 14 is positioned facing the interior I of the vehicle V when the in-module media assembly 12 is installed into the vehicle V. The interior-facing side 24 includes a video and audio display and a user interface for the occupant to operate the in-module media assembly 12. The non-interior facing side 25 faces the cavity when the in-module media assembly 12 is installed into the vehicle V. The display screen 14 is conventional and will not be further discussed in detail.

As shown, in the first illustrated embodiment, the media chassis 16 is mounted to a lower half 26 of the display screen 14 and extends from the non-interior facing side 25 of the display screen 14. The media chassis 16 is configured to house one or more electrical components (not shown), including, for example, but not limited to printed circuit boards, integrated circuits, AM, FM, and satellite radio receivers, CD players, multi-CD changers, digital audio players, and cassette tape decks and/or a navigation system. In the illustrated embodiment, the term "electrical component" used herein may refer to any electrical device or any portion of an electrical device that may require the use of a chassis. Preferably, the media chassis 16 further includes components that enable the occupant to access or manipulate the electrical components housed within the chassis. For example, the user interface of the display screen 14 in electrical communication with one or more electrical components housed within the media chassis 16. In this embodiment, the media chassis 16 may be associated with the display screen 14.

The media chassis 16 is a single or multi-piece a rigid member. Preferably, the media chassis 16 is made of a metallic material such as acrylonitrile butadiene styrene (ABS) with steel fiber. In other cases, polycarbonate acrylonitrile butadiene styrene (PCABS) with carbon fiber may be used to construct the media chassis 16. In the illustrated embodiment, the media chassis 16 is constructed of ABS with steel fiber. The media chassis 16 can further include a conductive polymer to construct media chassis 16 for weight reduction. The media chassis 16 can also be made of any material that provides electromagnetic radiation shielding and shock absorbance.

Figure 4:
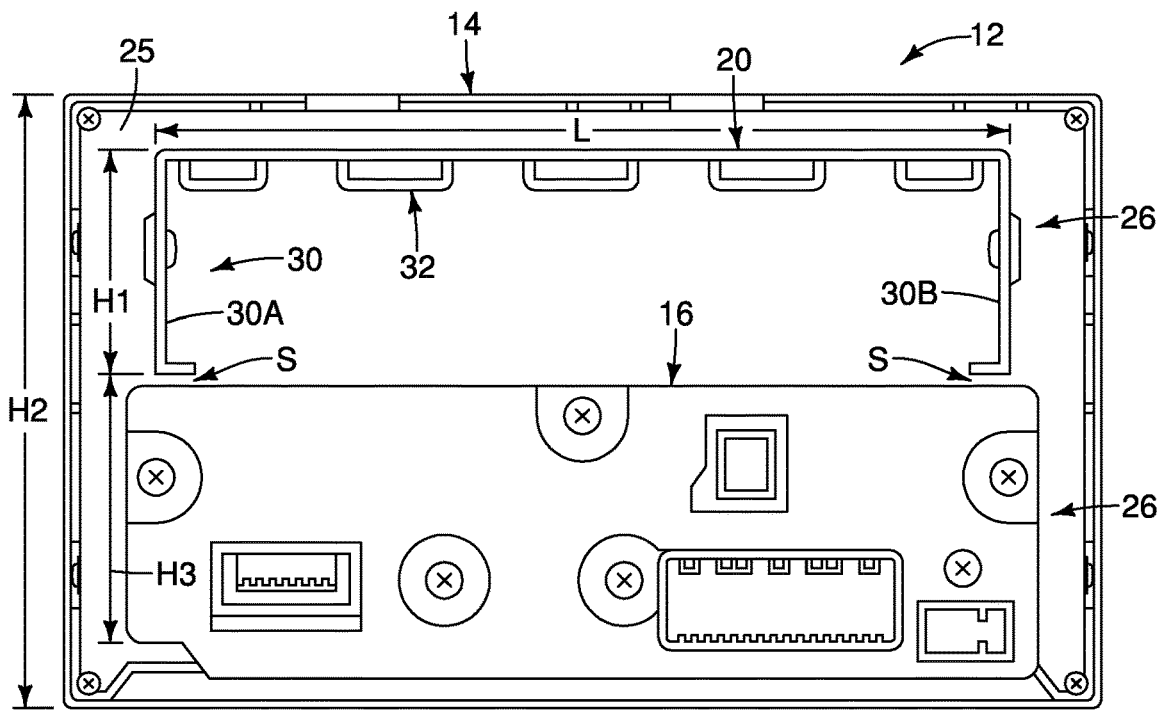
FIG. 4 is a rear elevational view of the in-module media assembly prior to displacement.

The shock absorption member 20 of the illustrated embodiment will now be further discussed. The shock absorption member 20 is a rigid metallic member that is cantilevered with respect to the media chassis 16. Preferably, the shock absorption member 20 is made of steel. More preferably, the shock absorption is made of ABS with steel fiber for rigidity, durability and weight reduction. In the illustrated embodiment, as best seen in FIG. 4, the shock absorption member 20 has a vertical height H1 that is approximately fifty percent of a vertical height H2 of the display screen 14. Preferably, the vertical height H1 of the shock absorption member 20 is at least approximately one-third of the vertical height H2 of the display screen 14. More preferably, the vertical height H1 of the shock absorption member 20 is at least fifty percent of the vertical height H2 of the display screen 14. Additionally, the vertical height H1 of the shock absorption member 20 is fifty percent or more of a vertical height H3 of the media chassis 16.

Figure 3:
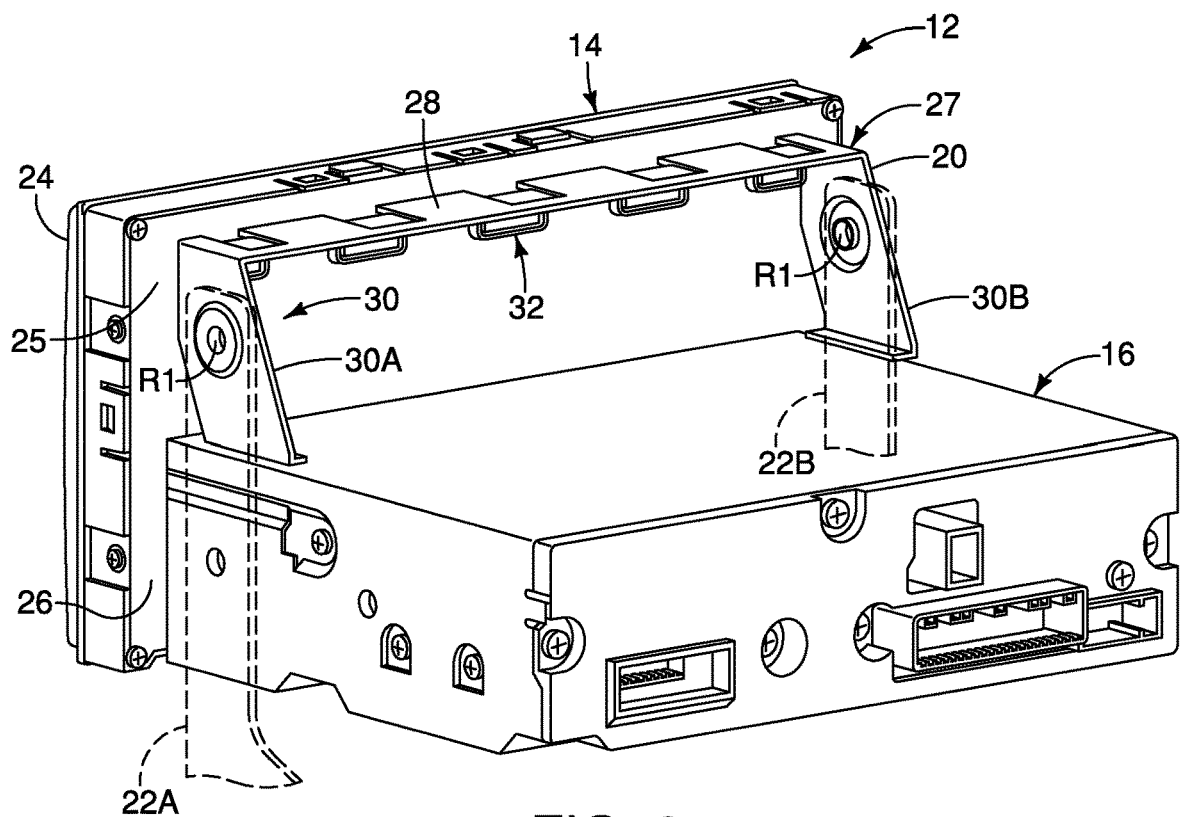
FIG. 3 is a rear perspective view of the in-module media assembly prior to displacement.

As best seen in FIGS. 3 and 4, the shock absorption member 20 has a screen attachment part 28 and a contact part 30. The screen attachment part 28 is attached to an upper half 27 of the display screen 14 and extends from the non-interior facing side 25. In the illustrated embodiment, the screen attachment part 28 extends along a lateral length L of the shock absorption member 20. The screen attachment part 28 is fixedly connected to the interior-facing side 24 of the display screen 14. Preferably, in the illustrated embodiment, the screen attachment part 28 and the display screen 14 are attached via boss attachment. In particular, the screen attachment part 28 includes a plurality of protrusions 32 and indentations that correspond to a plurality of protrusions and indentations 33 of the display screen 14. Alternatively, it will be apparent to those skilled in the vehicle field from this disclosure that the screen attachment part 28 and the display screen 14 can be attached via a plurality of conventional attachment mechanisms, such as by connecting bolts, screws or welding.

The contact part 30 of the first illustrated embodiment is configured to contact the media chassis 16 upon the in-module media assembly 12 experiencing a prescribed impact from the interior object. In particular, the contact part 30 is configured to contact the media chassis 16 upon relative movement of the upper half 27 of the display screen 14 towards the media chassis 16. Alternatively, the contact part 30 can displace in the forward direction relative to the media chassis 16, as will be further discussed below. Thus, the contact part 30 is configured to at least one of contact the media chassis 16 and displace relative to the media chassis 16 upon relative movement of the upper half 27 of the display screen 14 towards the media chassis 16. Preferably, the contact part 30 and the screen attachment part 28 of the shock absorption member 20 is a one-piece member. In particular, the contact part 30 and the screen attachment part 28 is formed as a one-piece molded steel.

Figure 5:
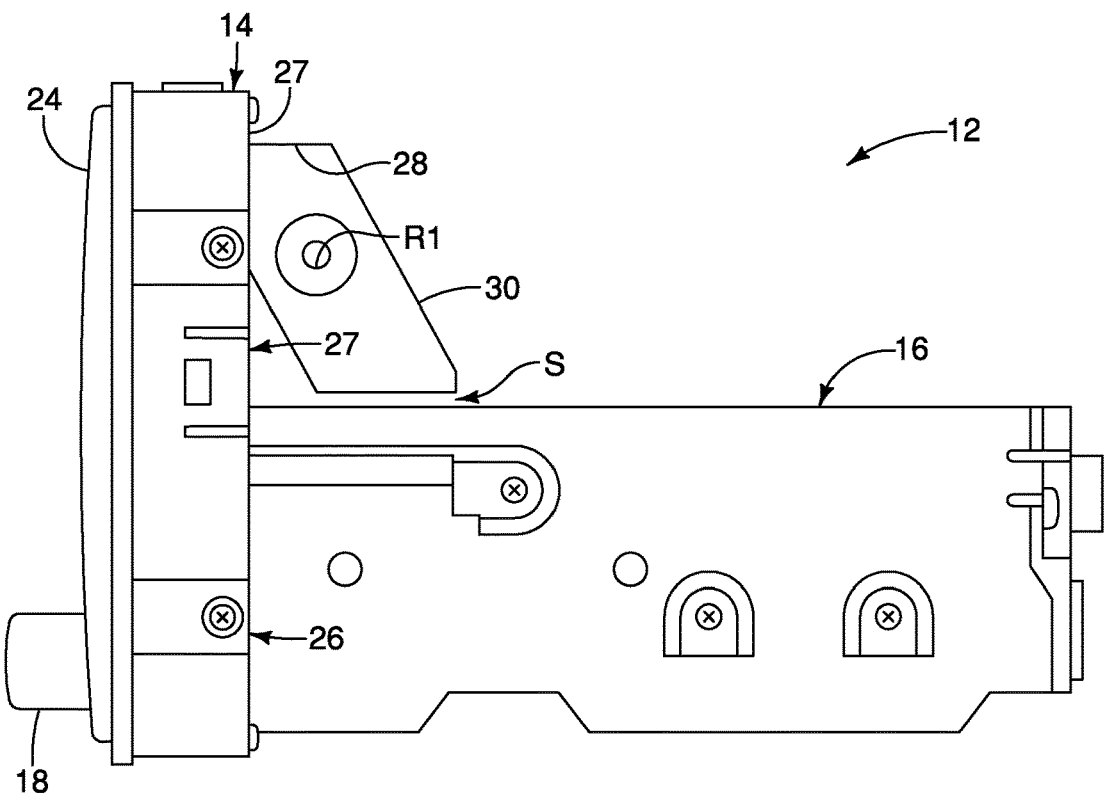
FIG. 5 is a side elevational view of the in-module media assembly prior to displacement.
Figure 6:
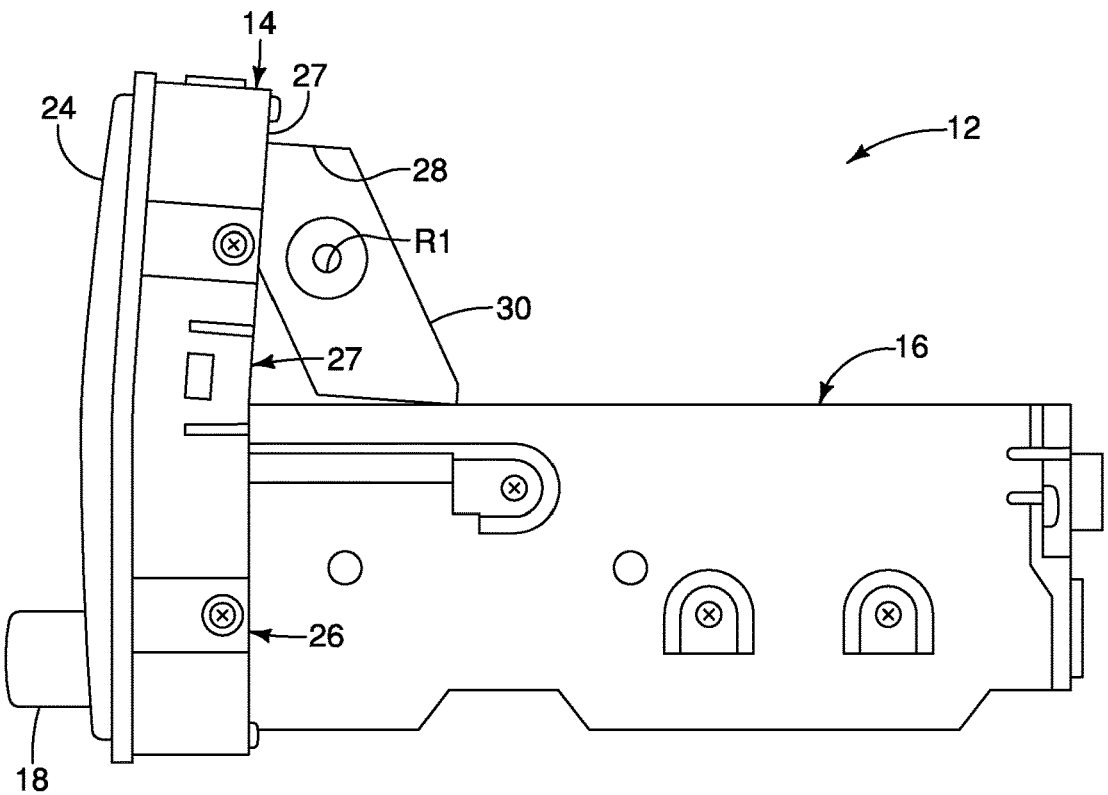
FIG. 6 is a side elevational view of the in-module media assembly with the display screen slightly displaced.
Figure 7:
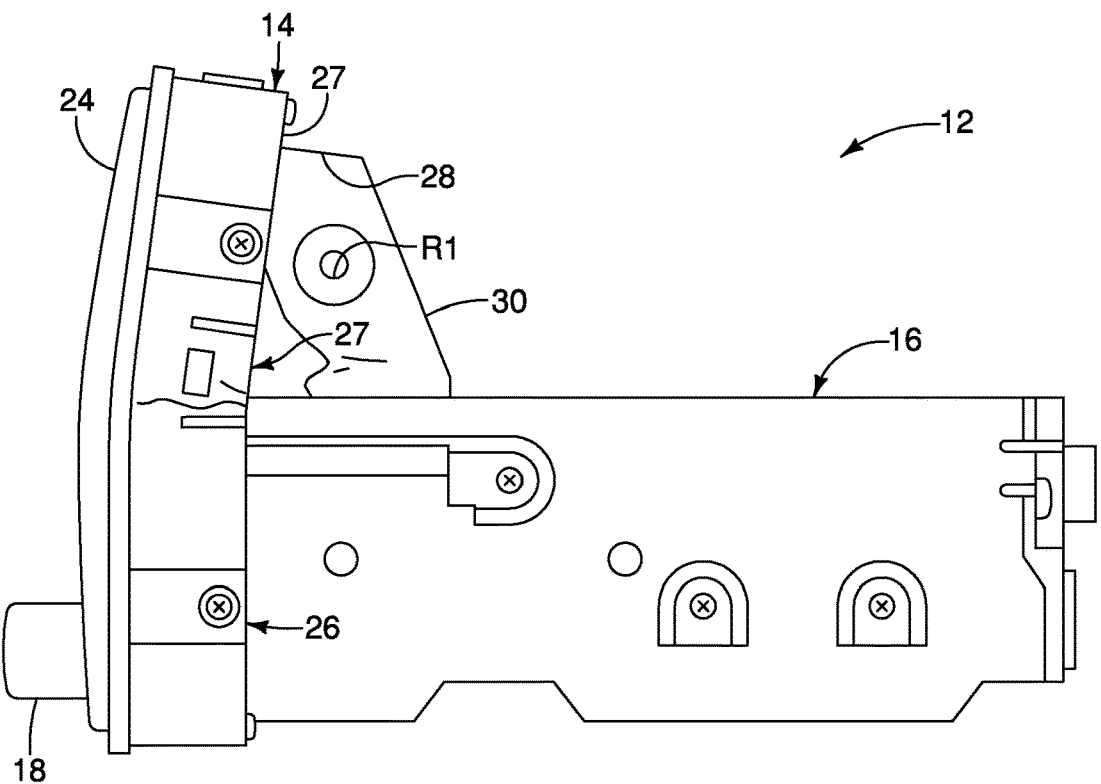
FIG. 7 is a side elevational view of the in-module media assembly with the display screen further displaced.
Figure 8:
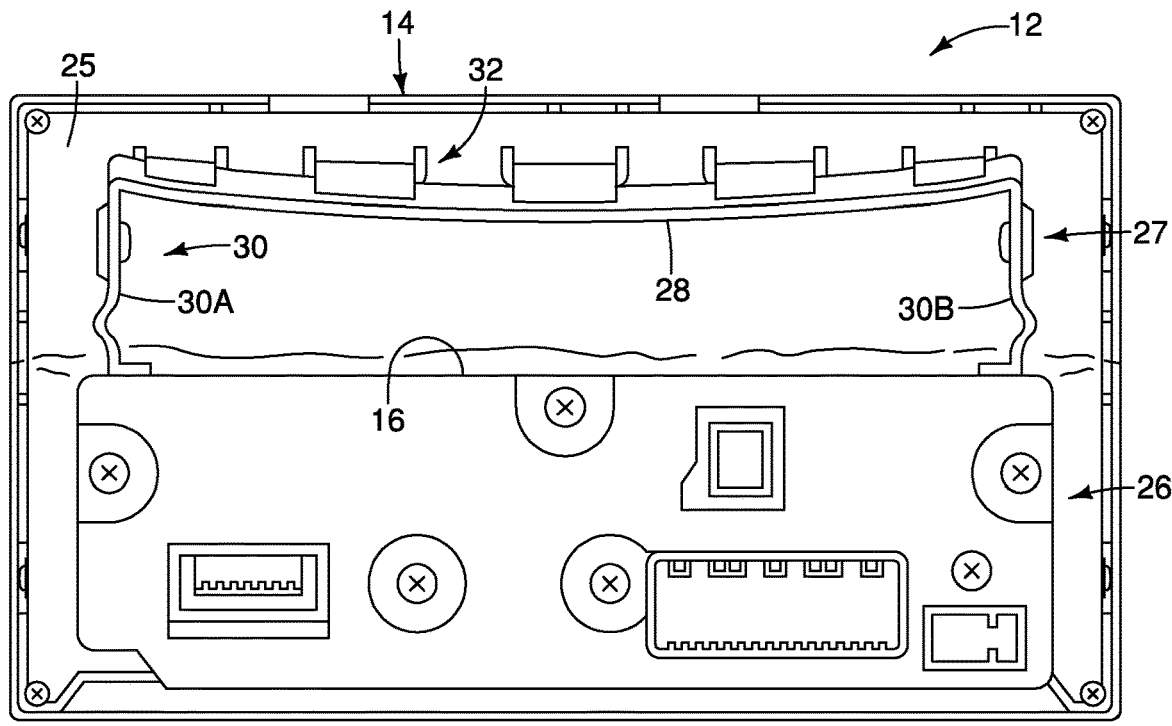
FIG. 8 is a rear elevational view the in-module media assembly with the display screen further displaced.

As best seen in FIGS. 4 and 5, the contact part 30 is spaced from the media chassis 16 when the display screen 14 has not moved relative to the media chassis 16. In other words, the media chassis 16 and the contact part 30 are separated by a space S S. Upon relative movement between the display screen 14 and the media chassis 16, the contact part 30 closes the space S S to contact the media chassis 16, as seen in FIGS. 6 to 8. The space S separating the contact part 30 and the media chassis 16 can be minimal. In the illustrated embodiment, the space S is preferably 1.5 millimeters in height. However, it will be apparent to those skilled in the vehicle field from this disclosure that the space S can vary depending on the dimensions of the shock absorption member 20, media chassis 16 and the display screen 14.

The contact part 30 includes a first contact section 30A and a second contact section 30B. The first and second contact sections 30A and 30B extend cantilevered with respect to the display screen 14 from the screen attachment part 28. As shown, the first and second contact sections 30A and 30B extend from the screen attachment part 28 towards the media chassis 16. The first and second contact sections 30A and 30B extend from opposite lateral ends of the screen attachment part 28. Upon relative movement of the upper half 27 of the display screen 14 towards the media chassis 16, the first and second contact sections 30A and 30B close the space S S to contact the media chassis 16. Further, as seen in FIGS. 6 to 8, the shock absorption member 20 can deform upon contact with the media chassis 16 and/or displace forward, depending on the force received. In the illustrated embodiment, the display screen 14 is configured to deflect towards the media chassis 16 upon receiving an impact of approximately seventy Newtons or greater. However, it will be apparent to those skilled in the vehicle field from this disclosure that the display screen 14 can deflect towards the media chassis 16 upon receiving a variable force depending on the weight and dimensions of all of the components of the in-module media assembly 12.

As seen in FIGS. 2 and 3, the shock absorption member 20 further includes at least one connecting bolt. The connecting bolt connects the shock absorption member 20 and the media chassis support structure 22. As shown, the shock absorption member 20 includes a pair of connecting bolts connecting the shock absorption member 20 and the media chassis support structure 22. Thus, the at least one connecting bolt includes a pair of connecting bolts. It will be apparent to those skilled in the vehicle field from this disclosure that the shock absorbing member can be configured to include additional or fewer connecting bolts as needed and/or desired.

As best seen in FIG. 3, the contact portion includes a pair of receiving holes, each receiving one of the connecting bolts. In particular, the first and second contact sections 30A and 30B of the shock absorption member 20 each includes a receiving hole configured to receive the at least one connecting bolt. The first and second rack mounts 22A and 22B of the media chassis support structure 22 each includes a receiving hole, aligned with the receiving holes of the first and second contact sections 30A and 30B. Each of the connecting bolts are disposed in one of the receiving holes of the media chassis support structure 22. The connecting bolts of the first illustrated embodiment are conventional. However, it will be apparent to those skilled in the vehicle field that the connecting bolts can be shear bolts that are displaced from the receiving holes of the media chassis support structure 22 upon relative movement of the display screen 14 towards the media chassis 16.

Figure 9:
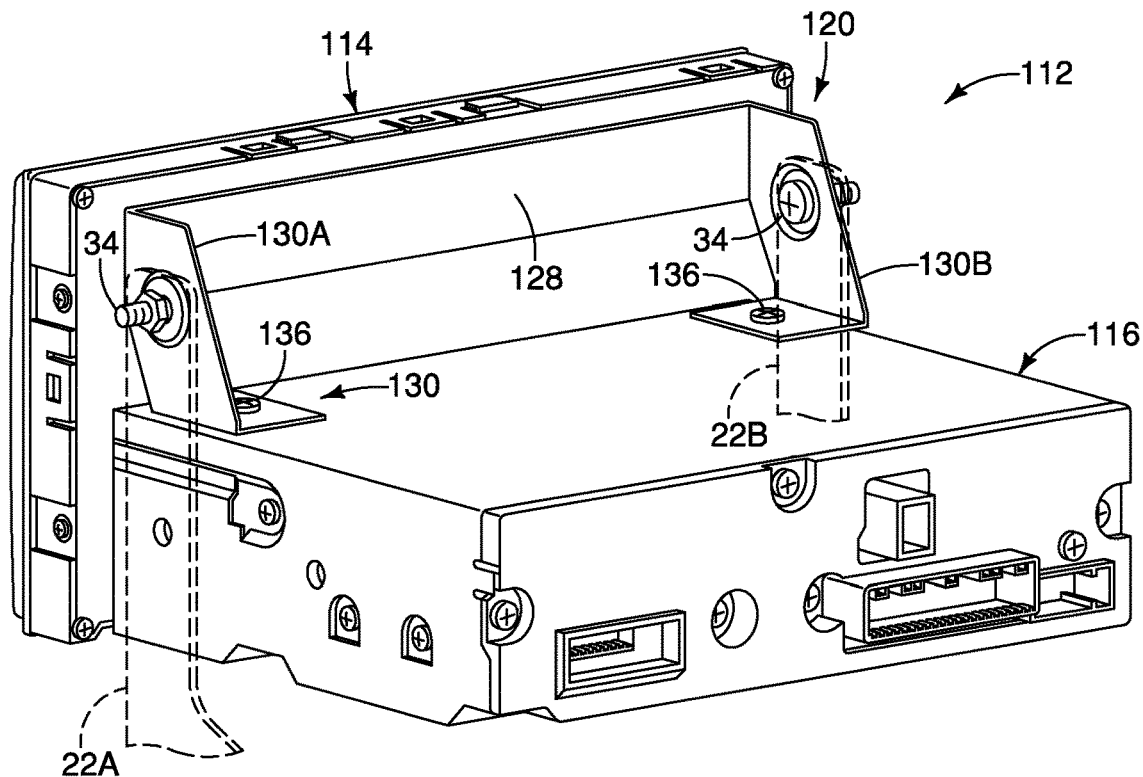
FIG. 9 is a rear perspective view of a first modified in-module media assembly prior to displacement.
Figure 10:
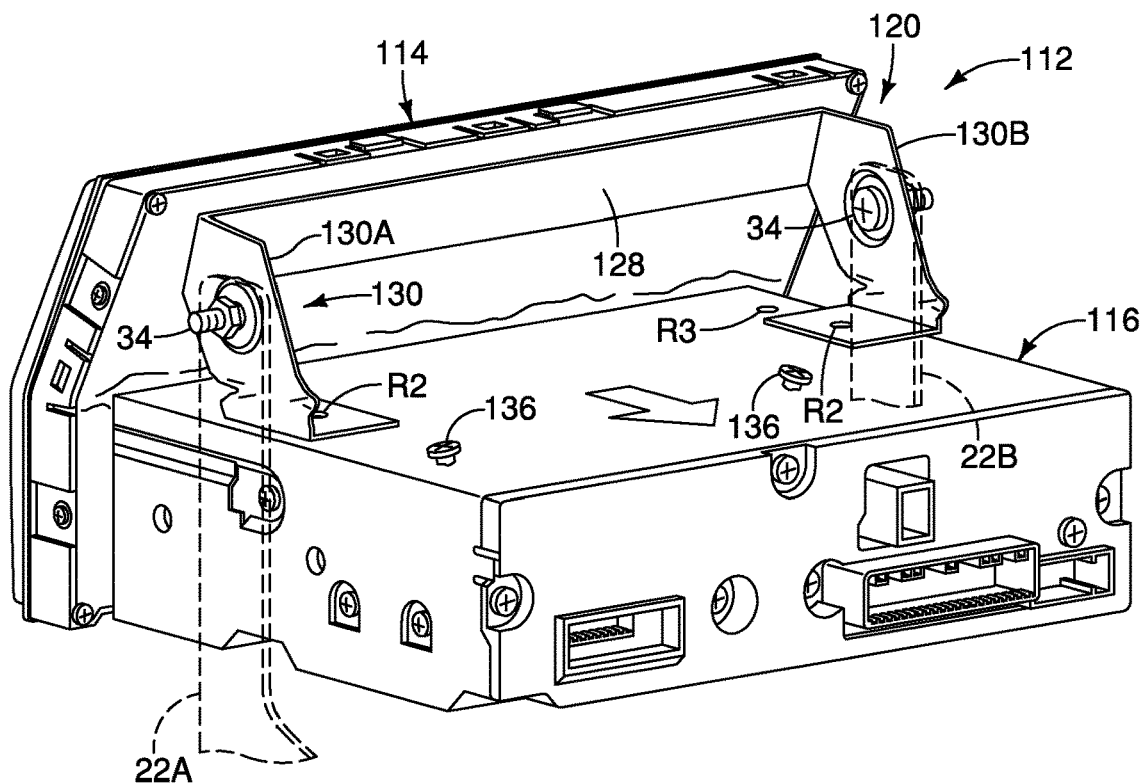
FIG. 10 is a rear perspective view of the first modified in-module media assembly after displacement of the display screen.

Referring now to FIGS. 9 and 10, a first modified in-module media assembly 112 will now be discussed. The first modified in-module media assembly 112 is basically identical to the in-module media assembly 12 of the first illustrated embodiment except that the first modified in-module media assembly 112 has a first modified shock absorption member 120. The first modified in-module media assembly 112 further includes a modified display screen 114 and a modified media chassis 116. Due to the similarities between the first modified in-module media assembly 112 and the in-module media assembly 12, all corresponding identical components of the first modified in-module media assembly 112 will receive the same reference numeral as the in-module media assembly 12. All modified components of the first modified in-module media assembly 112 will receive the same reference numeral as the in-module media 12 assembly plus 100.

The first modified shock absorption member 120 is similar to the shock absorption member 20 of the first illustrated embodiment. The first modified in-module media assembly 120 has been modified such that the screen attachment part is a screen contact part 128. The first modified absorption member further includes a contact part 130 that includes first and second contact sections 130A and 130B. The first modified in-module media assembly 120 is not separated from the media chassis by a space. Rather, the first modified in-module media assembly 120 is in contact with the media chassis 116 upon at a pre-impact state of the modified shock absorption member, seen in FIG. 9. The first modified in-module media assembly 120 is configured to deform and displace in the vehicle forward direction upon relative movement of the upper half of the display screen 114 towards the media chassis 116, as seen in FIG. 10.

The modified display screen 114 is basically identical to the display screen 14 of the first illustrated embodiment except that the modified display screen 114 does not include indentations and protrusions for a boss attachment. As the first modified in-module media assembly 120 is secured to the modified media chassis 116, the first modified in-module media assembly 120 can simply abut or rest against the display screen 114 without a boss attachment. Alternatively, it will be apparent to those skilled in the vehicle field from this disclosure that the first modified in-module media assembly 120 can be spaced from display screen 114 in the first modified in-module media assembly 112 such that the space is closed upon relative movement of the upper half of the display screen 114 towards the media chassis 116. It will also be apparent to those skilled in the vehicle field from this disclosure that the that first modified in-module media assembly 120 and the modified display screen 114 can be attached by a boss attachment as in the first illustrated embodiment.

The first modified in-module media assembly 120 further includes at least one contact bolt 136 connecting the contact part 130 and the media chassis 116. Preferably, the at least one contact bolt 136 includes a pair of contact bolts 136. As best seen in FIG. 10, the first and second contact sections 130 and 130B each includes a receiving hole R2, each receiving one of the contact bolts 136. Further, the media chassis includes a pair of receiving holes R3, each receiving hole R3 corresponding and aligning to a receiving hole of the first and second contact sections 130 and 130B to receive one of the pair of contact bolts 136. The contact bolts 136 are preferably shear bolts that will dislodge from the receiving holes R2 upon relative movement of the upper half of the display screen 114 towards the media chassis 116, as shown in FIG. 10. It will be apparent to those skilled in the vehicle field from this disclosure that the first modified in-module media assembly 112 can be further modified to include additional or just one contact bolt 136 as needed and/or desired.

Figure 11:
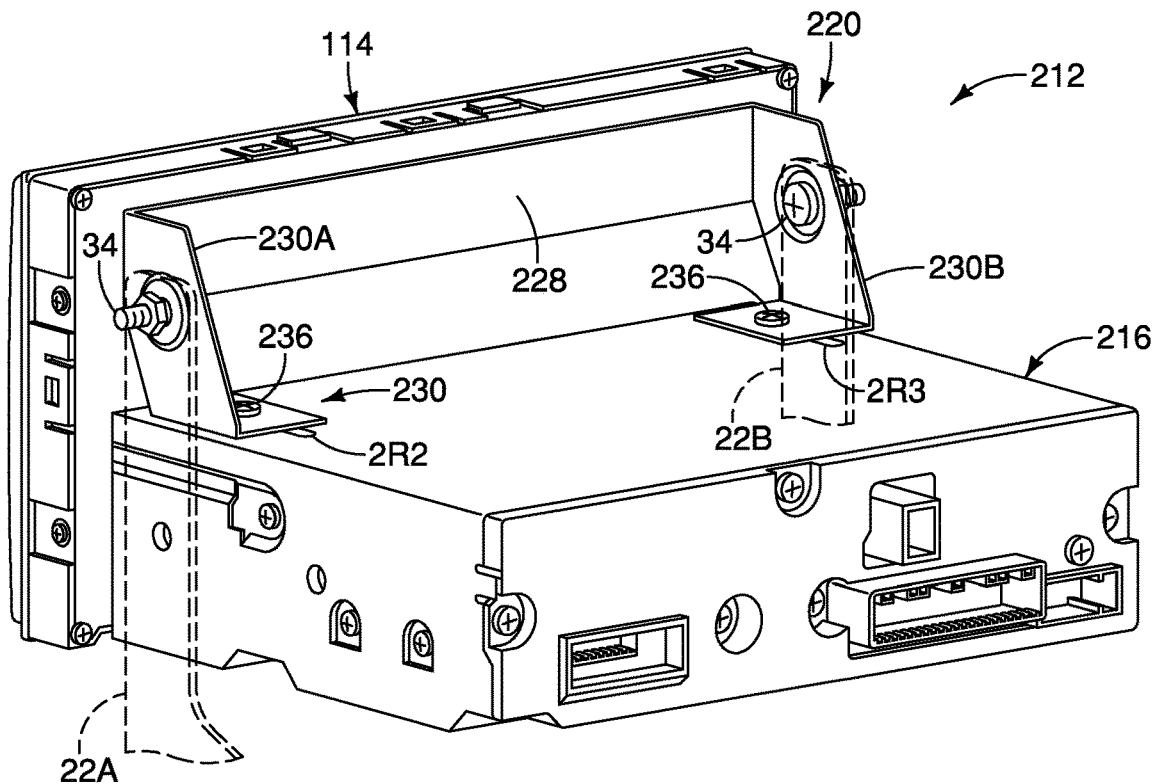
FIG. 11 is a rear perspective view of a second modified in-module media assembly prior to displacement.
Figure 12:
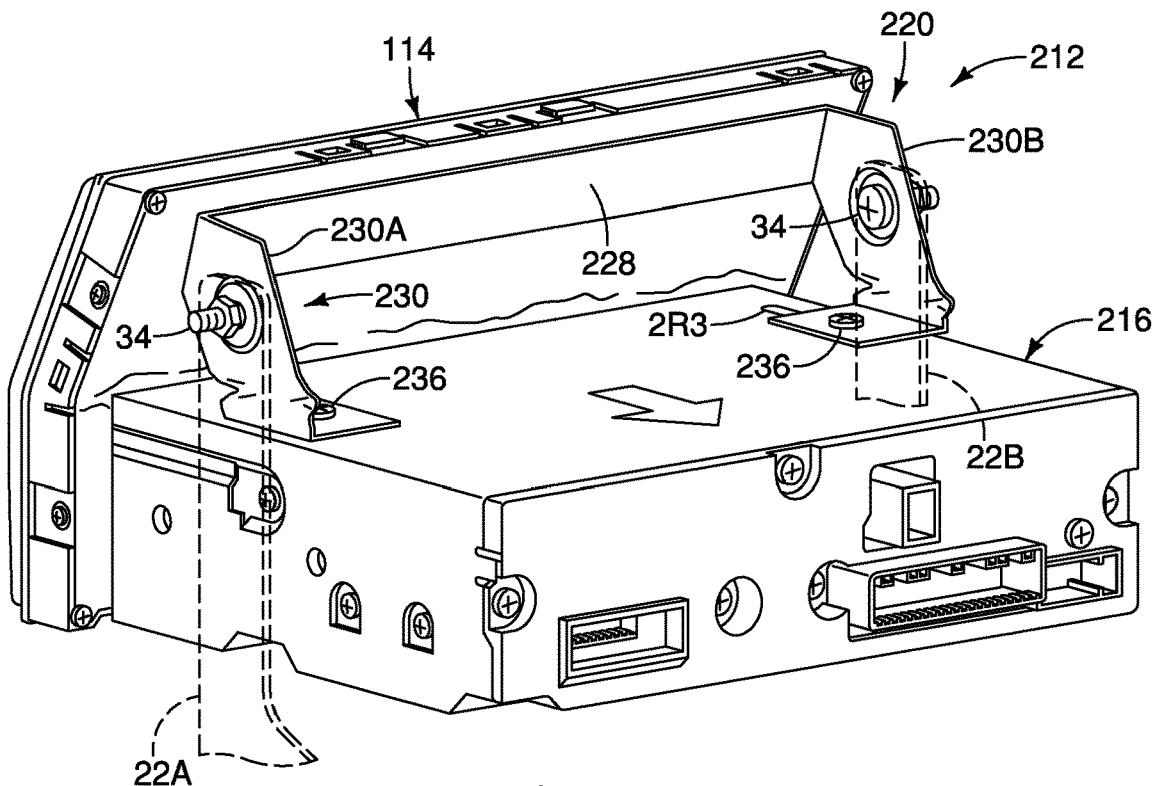
FIG. 12 is a rear perspective view of a second modified in-module media assembly after displacement of the display screen.
Figure 13:
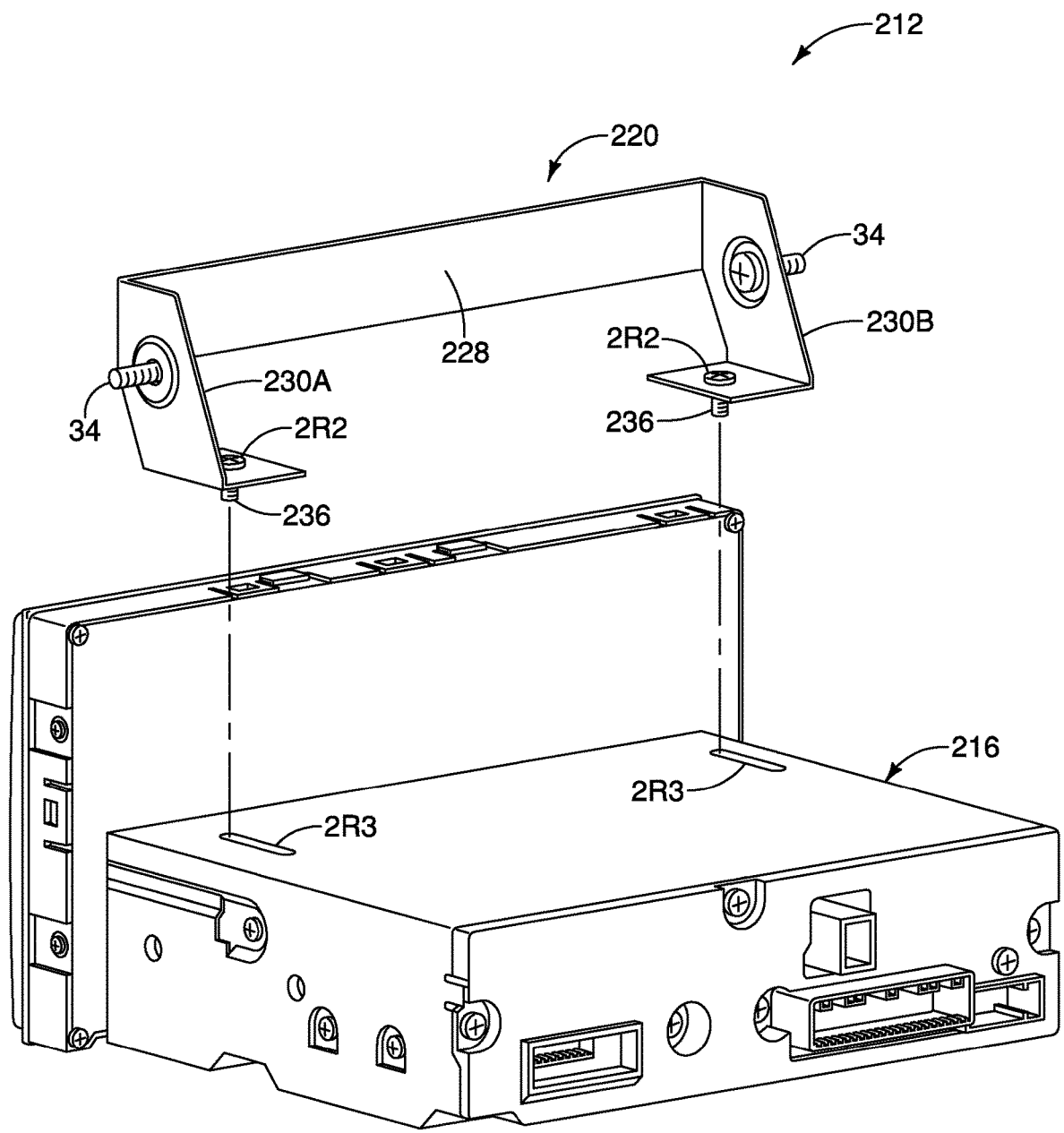
FIG. 13 is a rear perspective view of a second modified in-module media assembly prior to displacement with the shock absorption member exploded from the media chassis.

Referring now to FIGS. 11 to 13, a second modified in-module media assembly 212 will now be discussed. The second modified in-module media assembly 212 is basically identical to the first modified in-module media assembly 112 except that the second modified in-module media assembly 212 has a second modified shock absorption member 220. The second modified in-module media assembly 212 further includes the modified display screen 114 of the first modified media assembly 112, and a second modified media chassis 216. Due to the similarities between the second modified in-module media assembly 212 and the first modified in-module media assembly 112, all corresponding identical components of the second modified in-module media assembly 212 will receive the same reference numeral as the first modified in-module media assembly 112. All modified components of the second modified in-module media assembly 212 will receive the same reference numeral as the first modified in-module media assembly 112 plus 100.

The second modified shock absorption member 220 includes a screen contact part 228 and a contact part 230 that includes first and second contact sections 230A and 230B. The second modified shock absorption member 220 also includes at least one contact bolt 236 connecting the first and second contact sections 230A and 230B and the second modified media chassis 216. Preferably, the at least one contact bolt 236 includes a pair of contact bolts 236. The first and second contact sections 230A and 230B each includes a receiving hole 2R2 each receiving one of the contact bolts 236. Further, the second modified media chassis 216 includes a pair of receiving holes 2R3. In the third illustrated embodiment, the receiving holes of the second media chassis 216 is a pair of slots 2R3. Each slot 2R3 corresponds and aligns with a receiving hole 2R2 of the first and second contact sections 230A and 230B to receive one of the pair of contact bolts 236. Upon relative movement of the upper half of the modified display screen 114 towards the second modified media chassis 216, the contact bolts 236 will move along the slots 2R3 enabling the second modified shock absorption member 220 to displace forward, as seen in FIG. 12. It will be apparent to those skilled in the vehicle field from this disclosure that the first modified in-module media assembly 112 can be further modified to include additional or just one contact bolt 236 as needed and/or desired.

Figure 14:
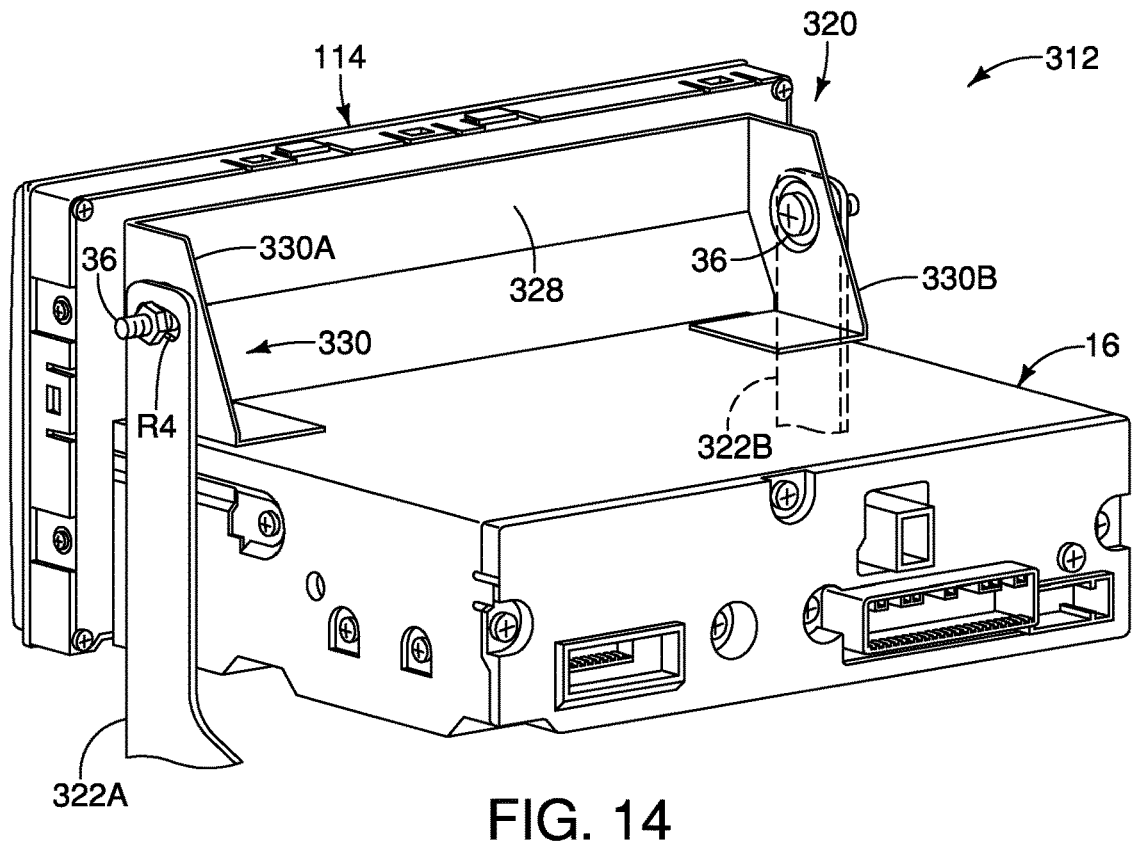
FIG. 14 is a rear perspective view of a third modified in-module media assembly prior to displacement.
Figure 15:
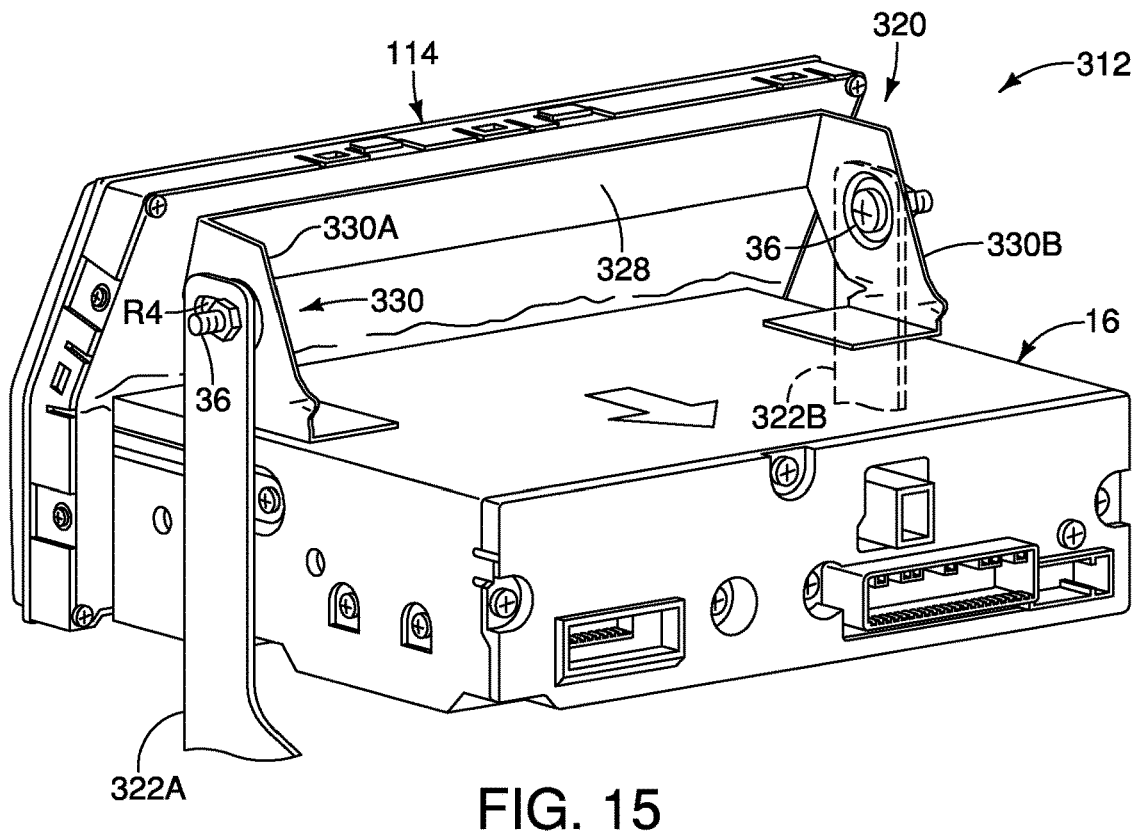
FIG. 15 is a rear perspective view of a third modified in-module media assembly after displacement of the display screen.

Referring now to FIGS. 14 and 15, a third modified in-module media assembly 312 will now be discussed. The third modified in-module media assembly 312 is basically identical to the second modified in-module media assembly 212 except that the third modified in-module media assembly 312 has a third modified shock absorption member 320. The third modified in-module media assembly 312 further includes the modified display screen 114 of the first modified in-module media assembly 112 and further includes the media chassis 16 that is identical to the first illustrated embodiment. Due to the similarities between the third modified in-module media assembly 312 and the previous in-module media assemblies 12, 112 and 212, all corresponding identical components of the third modified in-module media assembly 312 will receive the same reference numeral as a corresponding one of the previous in-module media assemblies 12, 112 and 212. All modified components of the third modified in-module media assembly 312 will receive the same reference numeral as the second modified in-module media assembly 212 plus 100.

The third modified shock absorption member 320 includes a screen contact part 328 and a contact part 330 that includes first and second contact sections 330A and 330B. The third modified shock absorption member 320 is configured to be compatible with a modified chassis support structure 322A and 322B. The modified chassis support structure 322A and 322B includes a pair of slots R4. Each of the slots R4 of the modified chassis support structure 322A and 322B preferably include a slight arc. Each slot R4 is configured to receive one of the connecting bolts 36 of the third modified shock absorption member 320. Upon relative movement of the upper half of the modified display screen 114 towards the media chassis 16, the connecting bolts 36 will move along the slots R4 enabling the third modified shock absorption member 320 to displace forward. It will be apparent to those skilled in the vehicle field from this disclosure that the third modified in-module media assembly 312 can be further modified to include additional or just one connecting bolt 36 as needed and/or desired.

Figure 16:
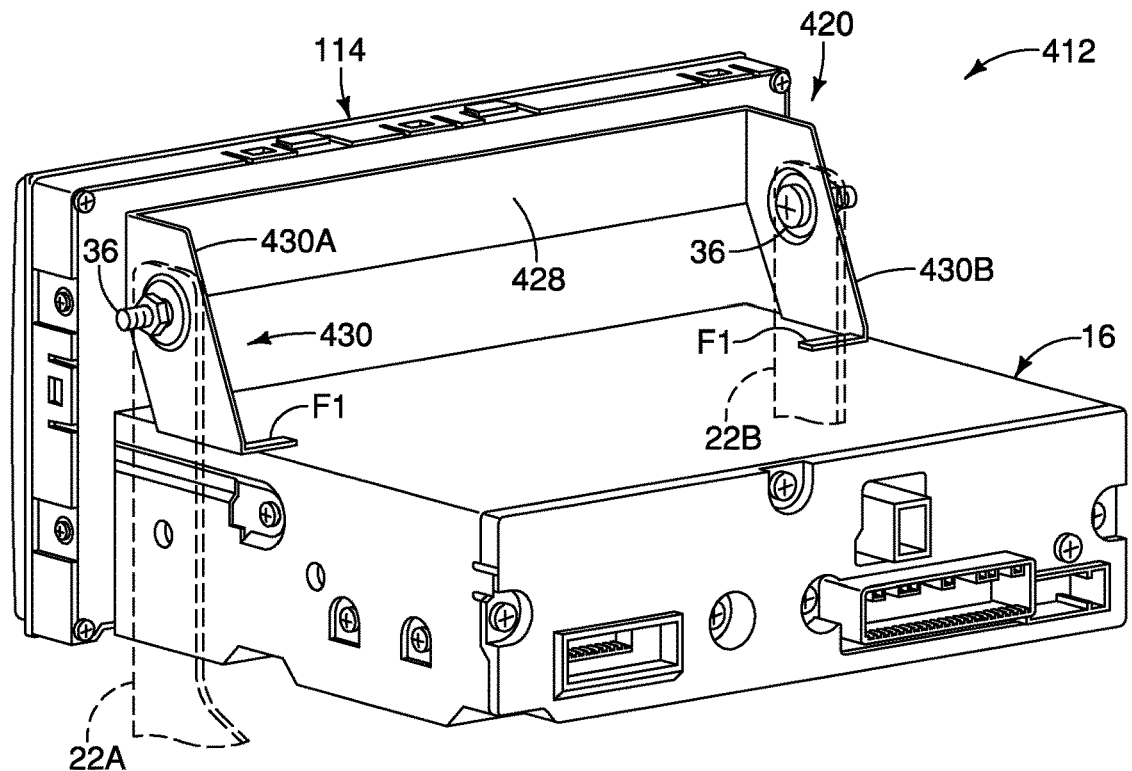
FIG. 16 is a rear perspective view of a fourth modified in-module media assembly prior to displacement.
Figure 17:
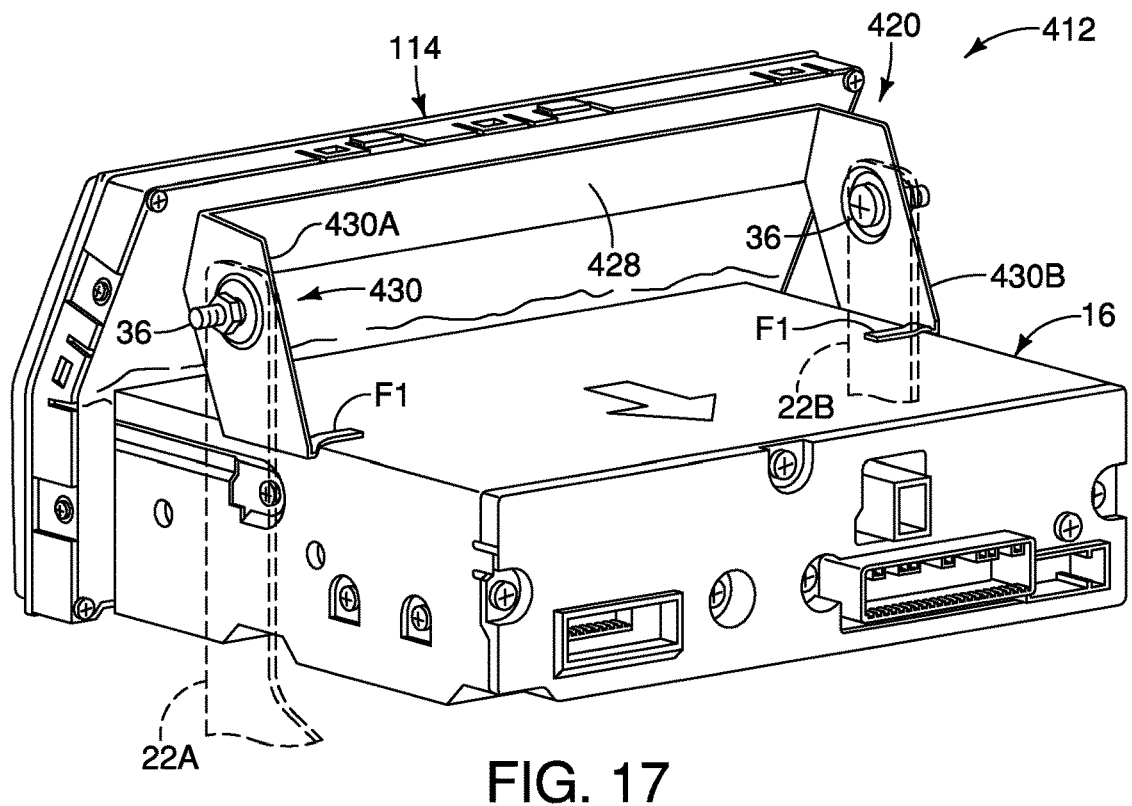
FIG. 17 is a rear perspective view of a fourth modified in-module media assembly after displacement of the display screen.

Referring now to FIGS. 16 and 17, a fourth modified in-module media assembly 412 will now be discussed. The fourth modified in-module media assembly 412 is basically identical to the third modified in-module media assembly 312 except that the fourth modified in-module media assembly 412 has a fourth modified shock absorption member 420. The fourth modified in-module media assembly 412 further includes the modified display screen 114 identical to the first modified media assembly 112 and further includes the media chassis 16 of the first illustrated embodiment. Due to the similarities between the fourth modified in-module media assembly 412 and the previous in-module media assemblies 12, 112, 212 and 312, all corresponding identical components of the third modified in-module media assembly 312 will receive the same reference numeral as a corresponding one of the previous in-module media assemblies 12, 112, 212 and 312. All modified components of the fourth modified in-module media assembly 412 will receive the same reference numeral as the third modified in-module media assembly 312 plus 100.

The fourth modified shock absorption member 420 includes a screen contact part 428 and a contact part 430 that includes first and second contact sections 430A and 430B. The contact part 430 includes a frangible section F1 that is configured to deform upon relative movement of the upper half of the display screen 114 towards the media chassis 16. The frangible section F1 can be a section of thinner metal that is more easily deformable upon impact with respect to the rest of the fourth modified shock absorption member 420. The frangible section F1 can alternatively be made of a more deformable metal than the rest of the fourth modified shock absorption member 420 so that the frangible section F1 deforms and enables shock absorption upon receiving an impact. As shown, the frangible section F1 includes at least one protruding tab. Preferably, the frangible section F1 includes a pair of protruding tabs, each protruding from one of the first and second contact sections 430A and 430B. As seen in FIG. 17, the protruding tabs are configured to deform from the contact part 430 upon relative movement of the upper half of the display screen 114 towards the media chassis. Alternatively, it will be apparent to those skilled in the vehicle field from this disclosure that the protruding tabs can entirely separate from the contact part 430 upon receiving enough force.

Figure 18:
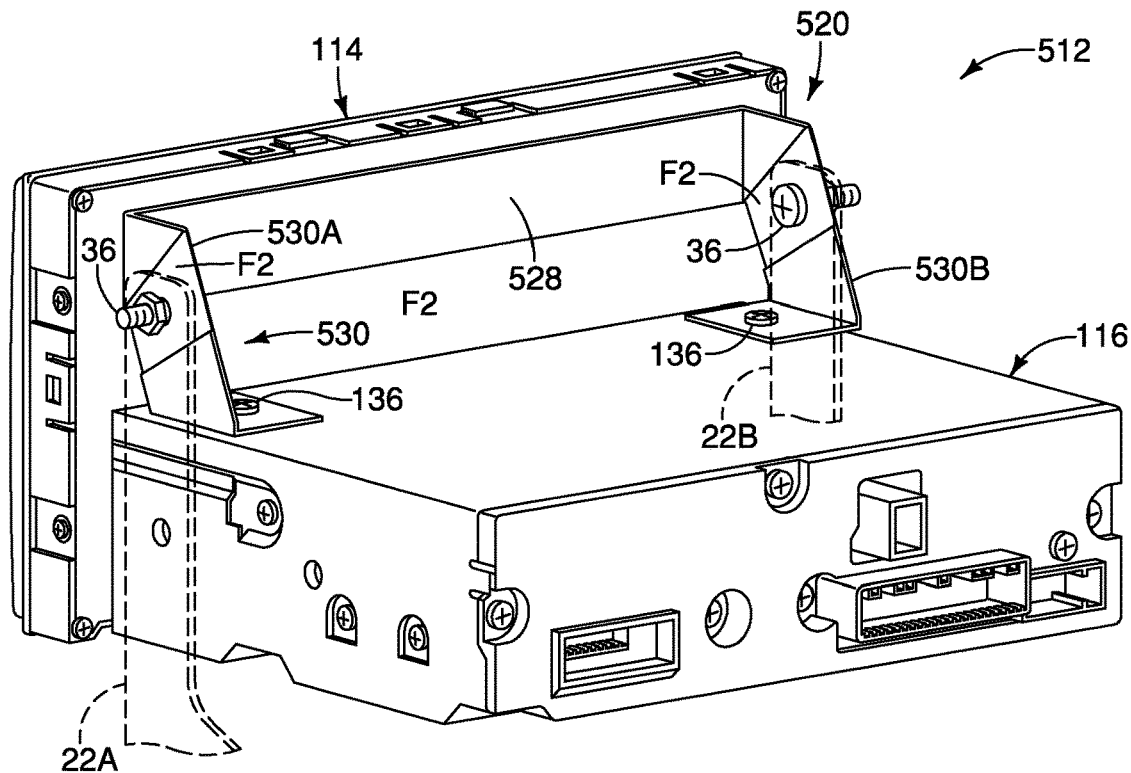
FIG. 18 is a rear perspective view of a fifth modified in-module media assembly prior to displacement.
Figure 19:
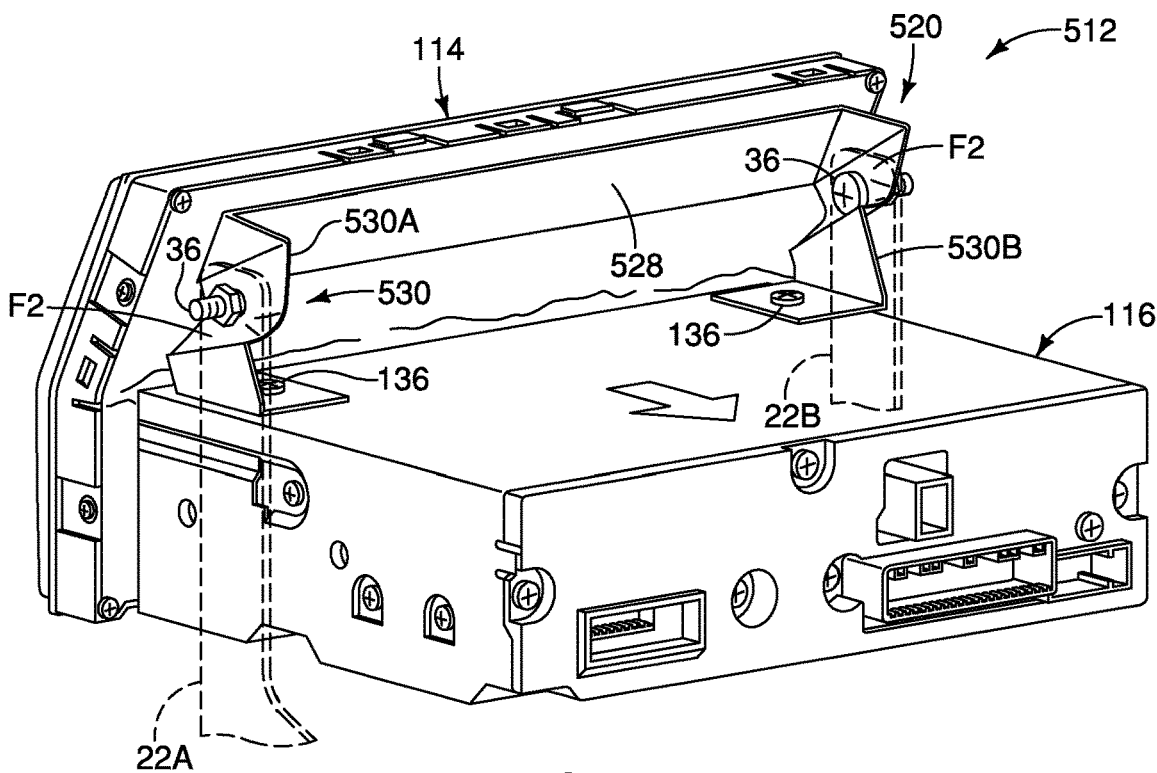
FIG. 19 is a rear perspective view of a fifth modified in-module media assembly after displacement of the display screen.
Figure 20:
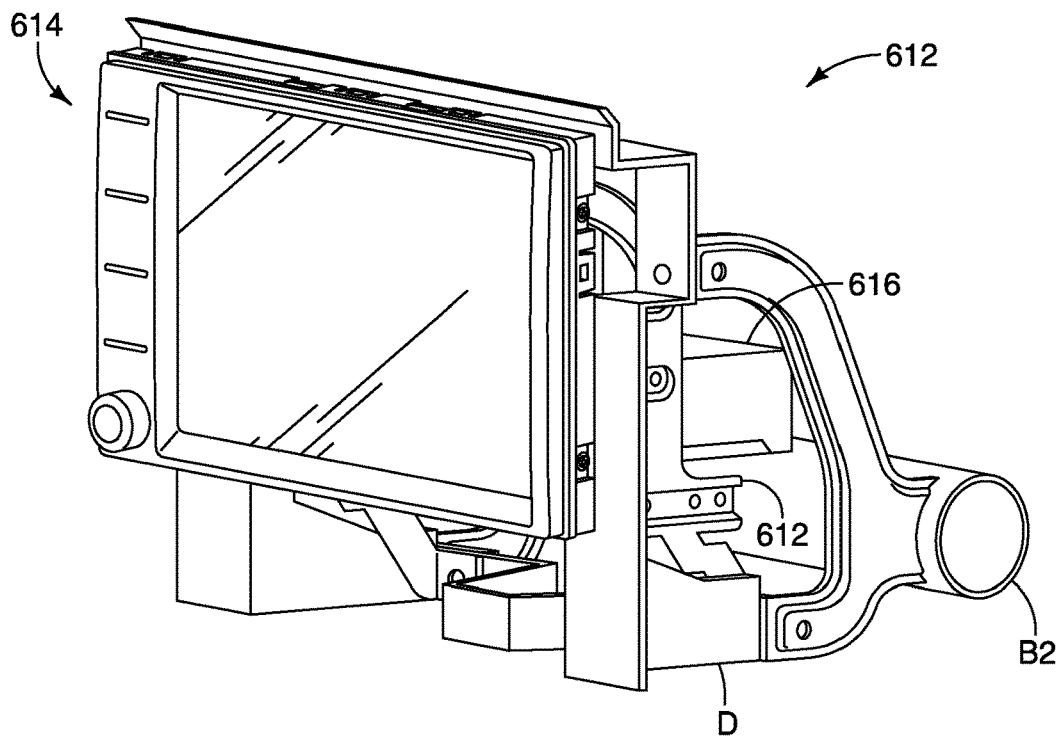
FIG. 20 is a front perspective view of an in-module media assembly in accordance with a second illustrated embodiment, the in-module media assembly being assembled to vehicle support parts.
Figure 21:
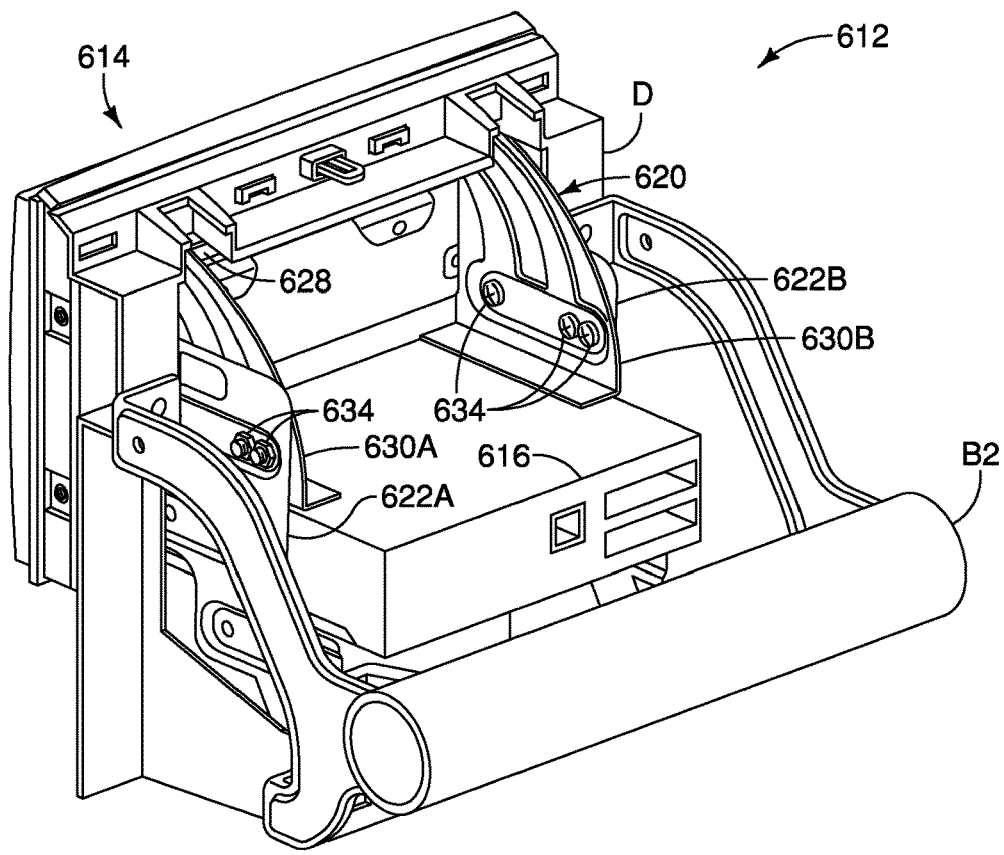
FIG. 21 is a rear perspective view of the in-module media assembly of the second illustrated embodiment prior to displacement of the display screen.

Referring now to FIGS. 18 and 19, a fifth modified in-module media assembly 512 will now be discussed. The fifth modified in-module media assembly 512 is basically identical to the first modified in-module media assembly 114 of FIGS. 9 and 10, except that the fifth modified in-module media assembly 512 has a fifth modified shock absorption member 520. The fifth modified in-module media assembly 512 further includes the modified display screen 114 and the modified media chassis 116 of FIGS. 9 and 10. Due to the similarities between the fourth modified in-module media assembly and the previous in-module media assemblies 12, 112, 212, 312 and 412, all corresponding identical components of the fifth modified in-module media assembly 512 will receive the same reference numeral as a corresponding one of the previous in-module media assemblies 12, 112, 212, 312 and 412. All modified components of the fifth modified in-module media assembly 512 will receive the same reference numeral as the fourth modified in-module media assembly 412 plus 100.

The fifth modified shock absorption member 512 includes a screen contact part 528 and a contact part 530 that includes first and second contact sections 530A and 530B. The contact part 530 includes a frangible section F2 that is configured to deform upon relative movement of the upper half of the display screen 114 towards the media chassis 116. The frangible section F2 can be a section of thinner metal that is more easily deformable upon impact with respect to the rest of the fifth modified shock absorption member 520. The frangible section F2 can alternatively be made of a more deformable metal than the rest of the fifth modified shock absorption member 520 so that the frangible section F2 deforms and enables shock absorption upon receiving an impact.

Referring now to FIGS. 20 to 25, an in-module media assembly 612 in accordance with a second illustrated embodiment will now be discussed. The in-module media assembly 612 is similar to the in-module media assembly 12, except that the in-module media assembly 612 of the second illustrated embodiment is sized and dimensioned for a larger vehicle (not shown). Due to the similarities between the in-module media assembly 612 of the second illustrated embodiment and the in-module media assembly 12, all corresponding identical components of the in-module media assembly 612 will receive the same reference numeral as the in-module media assembly 12. All modified components of the in-module media assembly 612 will receive the same reference numeral as the in-module media assembly 12 plus 600.

The in-module media assembly 612 includes a display screen 614, a media chassis 616 and a shock absorbing member 620. The shock absorbing member 620 includes a screen attachment part 628 and a contact part 630 that includes first and second contact sections 630A and 630B.

Figure 22:
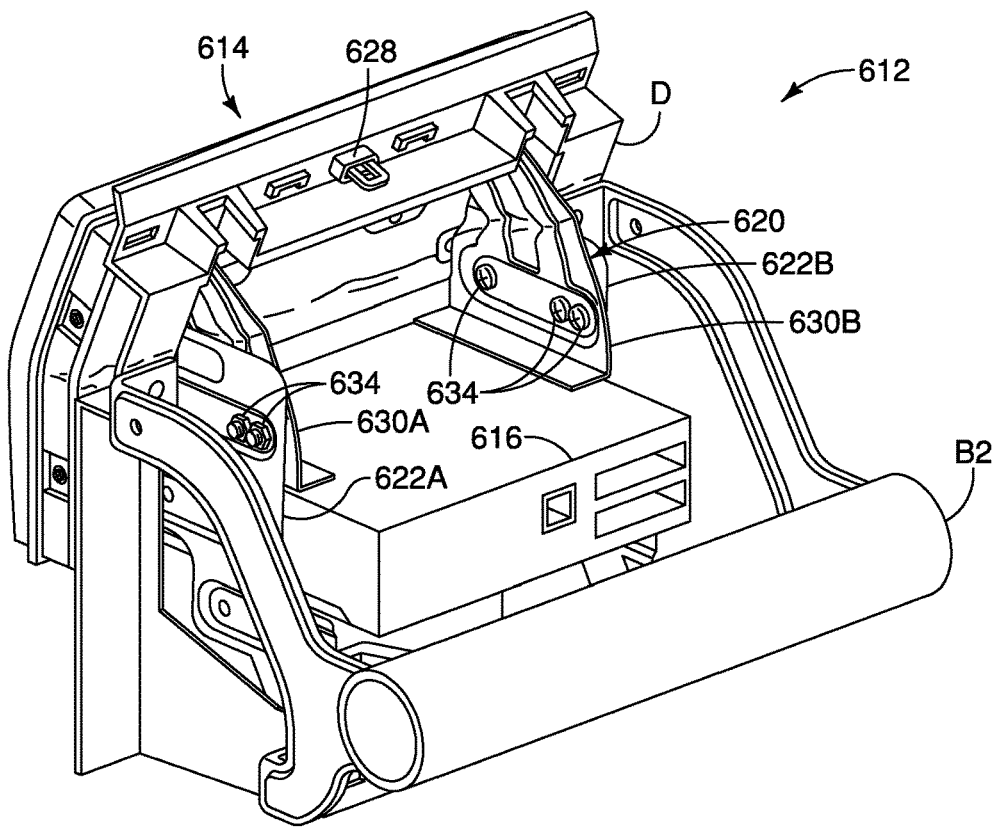
FIG. 22 is a rear perspective view of the in-module media assembly of the second illustrated embodiment after displacement of the display screen.
Figure 25:
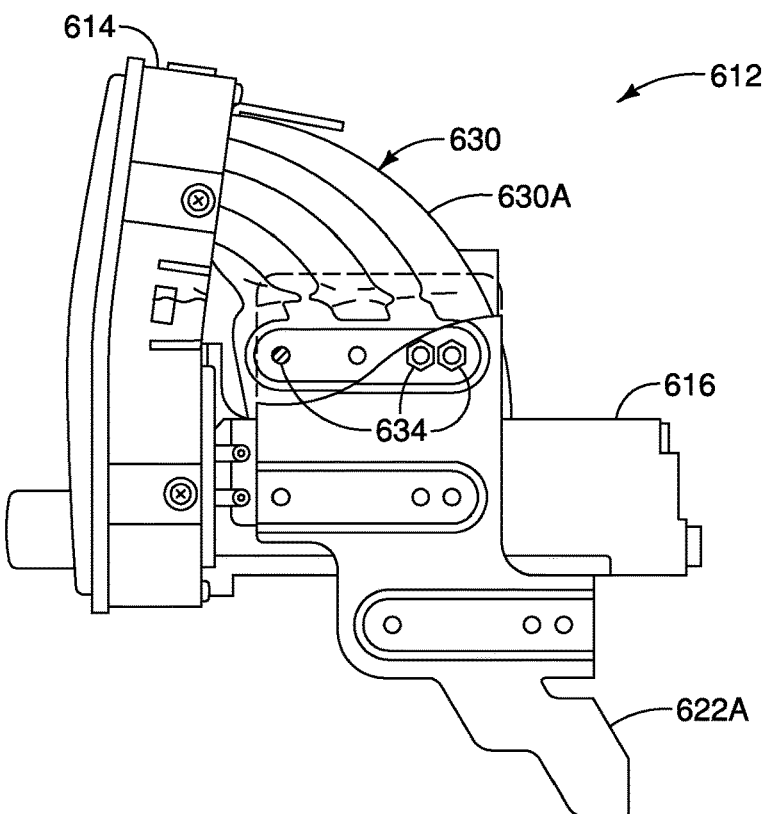
FIG. 25 is a side elevational view of the in-module media assembly of the second illustrated embodiment after displacement of the display screen.

Thus, the display screen 614, the media chassis 616 and the shock absorbing member 620 are all larger with respect to the display screen 614, the media chassis 616 and the shock absorbing member 620 of the first illustrated embodiment. The shock absorbing member 620 is spaced from the media chassis 616. The shock absorbing member 620 is configured to contact the media chassis 616 upon relative movement of the upper half of the display screen 614 towards the media chassis 616, as best seen in FIGS. 22 and 25.

Figure 23:
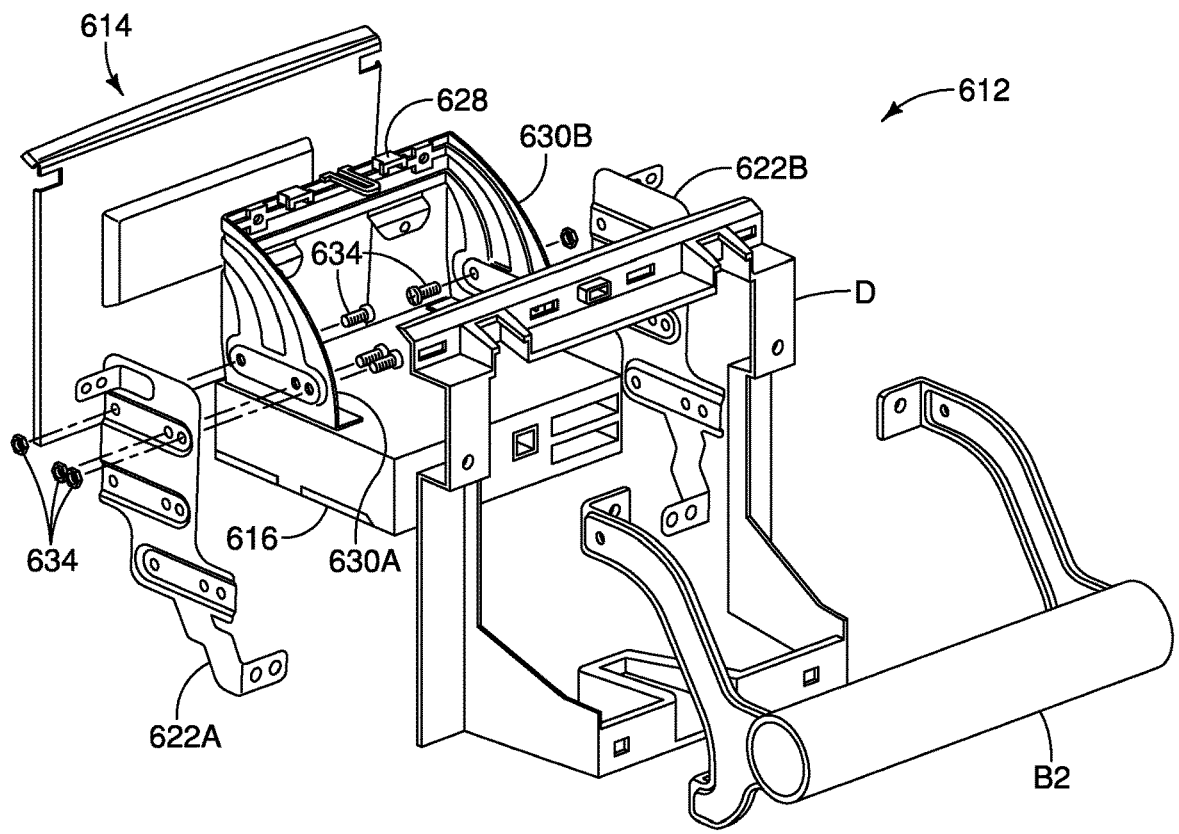
FIG. 23 is an exploded view of FIG. 21 with the in-module media assembly exploded from the vehicle support parts.
Figure 24:
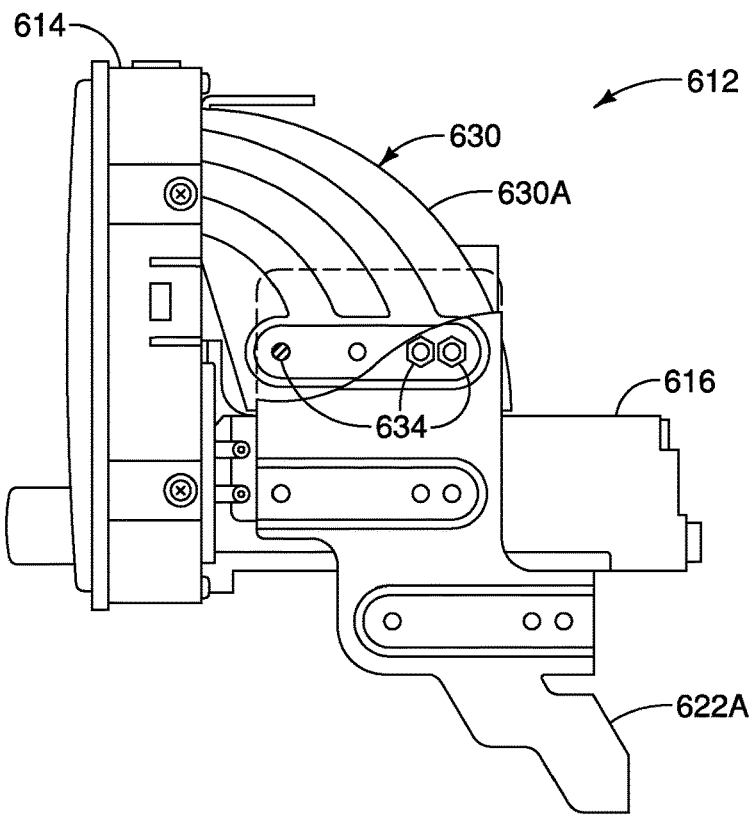
FIG. 24 is a side elevational view of the in-module media assembly of the second illustrated embodiment prior to displacement of the display screen.

The shock absorbing member 620 further includes at least one connecting bolt connecting the shock absorbing member 620 and a media support structure of the larger vehicle. As best seen in FIG. 23, the shock absorbing member 620 includes a pair of connecting bolts 634 on each side of the shock absorbing member 620. The connecting bolts 634 are preferably shear bolts 634 that can be displaced or dislodged upon relative movement of the upper half of the display screen 614 towards the media chassis 616. Depending on the amount of force received, and the number of connecting bolts 634, the connecting bolts 634 can dislodge while the shock absorbing member 620 deforms, rotates forward and/or displaces forward. However, it will be apparent to those skilled in the vehicle field from this disclosure that the shock absorbing member 620 can include fewer or additional connecting bolts 634 as needed and/or desired.

As seen in FIG. 23, the media support structure illustrated includes first and second rack mounts 622A and 622B that are fixedly attached to lateral sides of the shock absorbing member 620. The media support structure further includes an instrument panel substrate D fixedly connected to a cross-car beam B2 to further support the in-module media assembly 612 within the vehicle.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), directional terms (e.g., "forward", "rearward", "above", "downward", "vertical", "horizontal", "below" and "transverse" as well as any other similar directional terms) refer to those directions of a vehicle equipped with the in-module media assembly. Accordingly, these terms, as utilized to describe the present invention should be interpreted relative to a vehicle equipped with the in-module media assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An in-module media assembly comprising:
   a display screen having an interior-facing side and a non-interior facing side;
   a media chassis mounted to a lower half of the display screen and extending from the non-interior facing side of the display screen; and
   a shock absorbing member having a screen attachment part and a contact part, the screen attachment part being attached to an upper half of the display screen and extending from the non-interior facing side, the contact part being configured to at least one of contact the media chassis and displace relative to the media chassis upon relative movement of the upper half of the display screen towards the media chassis,
   the contact part being spaced from the media chassis when the display screen has not moved relative to the media chassis.

2. The in-module media assembly according to claim 1, wherein
   the contact part includes a first contact section and a second contact section, the first and second contact sections extending from the screen attachment part towards the media chassis.

3. The in-module media assembly according to claim 2, wherein
   the first and second contact sections extend from opposite lateral ends of the screen attachment part.

4. The in-module media assembly according to claim 3, wherein
   the contact part and the screen attachment part of the shock absorption member is a one-piece member.

5. The in-module media assembly according to claim 3, wherein
   the shock absorption member is made of steel.

6. An in-module media assembly comprising:
   a display screen having an interior-facing side and a non-interior facing side;
   a media chassis mounted to a lower half of the display screen and extending from the non-interior facing side of the display screen; and
   a shock absorbing member having a screen attachment part and a contact part, the screen attachment part being attached to an upper half of the display screen and extending from the non-interior facing side, the contact part being configured to at least one of contact the media chassis and displace relative to the media chassis upon relative movement of the upper half of the display screen towards the media chassis,
   the shock absorption member further including at least one contact bolt connecting the contact part and the media chassis, the at least one contact bolt being configured to move relative to the media chassis upon relative movement of the upper half of the display screen towards the media chassis.

7. The in-module media assembly according to claim 6, wherein
the at least one contact bolt includes a pair of contact bolts and the media chassis includes a pair of receiving holes, each receiving hole receiving one of the pair of contact bolts.

8. The in-module media assembly according to claim 7, wherein
the pair of receiving holes of the media chassis is a pair of slots.

9. The in-module media assembly according to claim 6, wherein
the at least one contact bolt is configured to dislodge from the contact part upon relative movement of the upper half of the display screen towards the media chassis.

10. An in-module media assembly comprising:
a display screen having an interior-facing side and a non-interior facing side;
a media chassis mounted to a lower half of the display screen and extending from the non-interior facing side of the display screen; and
a shock absorbing member having a screen attachment part and a contact part, the screen attachment part being attached to an upper half of the display screen and extending from the non-interior facing side, the contact part being configured to at least one of contact the media chassis and displace relative to the media chassis upon relative movement of the upper half of the display screen towards the media chassis,
the contact part including a frangible section extending from a contact arm, the frangible section being configured to deform upon relative movement of the upper half of the display screen towards the media chassis, the contact arm not overlying the media chassis and the frangible section overlying the media chassis.

11. The in-module media assembly according to claim 10, wherein
the frangible section includes at least one protruding tab configured to deform upon relative movement of the upper half of the display screen towards the media chassis.

12. A vehicle comprising,
the in-module media assembly of claim 1.

* * * * *